US012669627B2

(12) United States Patent
He et al.

(10) Patent No.: US 12,669,627 B2
(45) Date of Patent: Jun. 30, 2026

(54) METHOD FOR JUDGING GEOLOGY OF TIME-DELAYED EXTREMELY INTENSE ROCKBURST

(71) Applicant: NORTHEASTERN UNIVERSITY, Shenyang City (CN)

(72) Inventors: Benguo He, Shenyang City (CN); Xiangrui Meng, Shenyang City (CN); Xiating Feng, Shenyang City (CN); Hongpu Li, Shenyang City (CN); Fei Wang, Shenyang City (CN); Jie Wang, Shenyang City (CN); Lei Wang, Shenyang City (CN); Lei Hu, Shenyang City (CN); Zhibin Yao, Shenyang City (CN); Hongyuan Fu, Shenyang City (CN)

(73) Assignee: NORTHEASTERN UNIVERSITY, Shenyang City (CN)

( * ) Notice: Subject to any disclaimer, the term of this patent is extended or adjusted under 35 U.S.C. 154(b) by 0 days.

(21) Appl. No.: 19/132,760

(22) PCT Filed: Jun. 25, 2023

(86) PCT No.: PCT/CN2023/102123
§ 371 (c)(1),
(2) Date: May 23, 2025

(87) PCT Pub. No.: WO2024/169098
PCT Pub. Date: Aug. 22, 2024

(65) Prior Publication Data
US 2026/0072188 A1      Mar. 12, 2026

(30) Foreign Application Priority Data
Feb. 15, 2023      (CN) .......................... 202310116231.8

(51) Int. Cl.
*G01V 1/28* (2006.01)
*G01V 1/24* (2006.01)

(52) U.S. Cl.
CPC ................ *G01V 1/282* (2013.01); *G01V 1/24* (2013.01); *G01V 2210/67* (2013.01)

(58) Field of Classification Search
CPC ........ G01V 1/28; G01V 1/24; G01V 2210/67; G01V 1/301; G01V 2210/66; G01V 1/01
See application file for complete search history.

(56) References Cited

U.S. PATENT DOCUMENTS

2026/0072188 A1* 3/2026 He .......................... G01V 1/282

FOREIGN PATENT DOCUMENTS

CN 102749660 A 10/2012
CN 103953392 A 7/2014
(Continued)

*Primary Examiner* — Daniel Pihulic
(74) *Attorney, Agent, or Firm* — MUNCY, GEISSLER, OLDS & LOWE, P.C.

(57) ABSTRACT

Provided is a method for judging geology of a time-delayed extremely intense rockburst as to deep tunnel engineering. Information about geological structures is recorded according to methods such as geological mapping and advanced geological prediction of the tunnel face. Geometric characteristics of burst craters formed during the rockburst are recorded by utilizing advanced geological drilling and profile scanning technologies in a rockburst-damaged zone. 3D geostress in the rockburst-damaged zone is measured by using a stress relief method or a hydraulic fracturing method to determine the orientation of the maximum principal stress. A 3D numerical calculation model is established based on initial geostress testing results and physical and mechanical parameters of rock and structural discontinuities obtained through on-site geological investigations. By conducting excavation simulations under different combinations of structural discontinuities and performing numerical cal- (Continued)

Spatial positional relationship among structural discontinuities, burst crater boundaries and tunnel

↓

Spatial positional relationship among structural discontinuities, burst crater boundaries and orientation of maximum principal stress

↓

Rockburst damage characteristics under conditions of different geological structures

↓

Judgement of geology of a time-delayed extremely intense rockburst culation, the risk of time-delayed extremely intense rock-burst disasters at current locations after tunnel excavation is judged.

3 Claims, 7 Drawing Sheets

(56)                    References Cited

FOREIGN PATENT DOCUMENTS

| | | | | | |
|---|---|---|---|---|---|
| CN | 105807321 | A | | 7/2016 | |
| CN | 110374636 | Y | | 10/2019 | |
| CN | 116088033 | A | * | 5/2023 | .............. G01V 1/24 |
| KR | 10-1391218 | B1 | | 5/2014 | |
| RU | 2 761 226 | C1 | | 12/2021 | |
| WO | WO-2024169098 | A1 | * | 8/2024 | ............ G01V 1/301 |

* cited by examiner

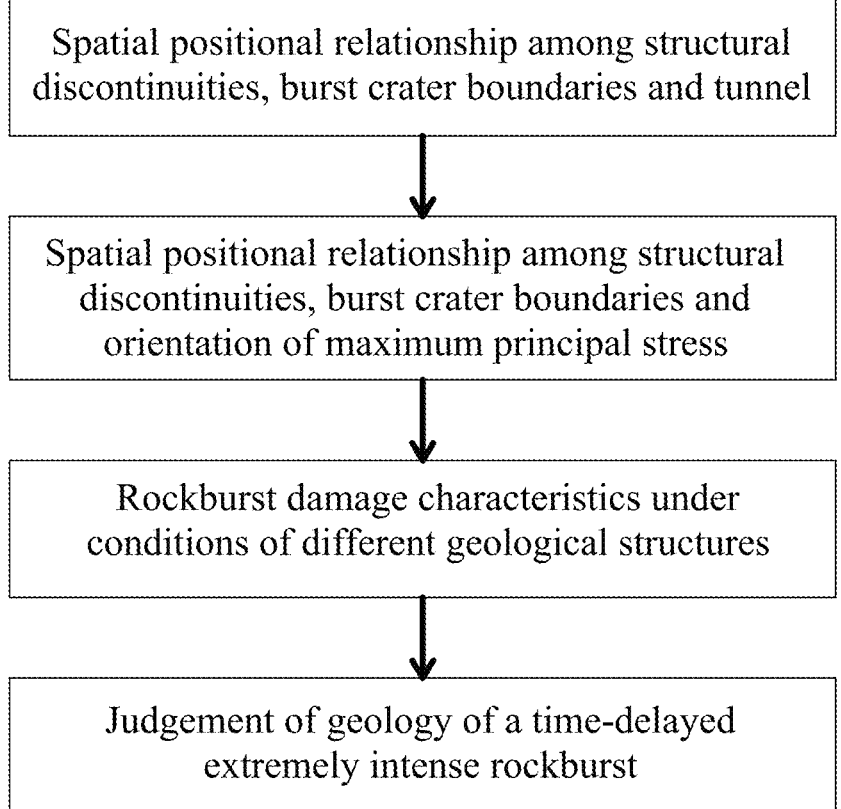

Spatial positional relationship among structural discontinuities, burst crater boundaries and tunnel Spatial positional relationship among structural discontinuities, burst crater boundaries and orientation of maximum principal stress Rockburst damage characteristics under conditions of different geological structures Judgement of geology of a time-delayed extremely intense rockburst

Structural discontinuities of faults

Structural
discontinuities of
joints (a)                                        (b)

METHOD FOR JUDGING GEOLOGY OF TIME-DELAYED EXTREMELY INTENSE ROCKBURST

TECHNICAL FIELD

The present invention relates to the technical field of deep tunnel engineering, in particular to a method for judging geology of a time-delayed extremely intense rockburst.

BACKGROUND

As transportation tunnels are progressively extending into deeper strata, they inevitably traverse geological structural zones characterized by extremely high geostress conditions. At the same time, deep underground engineering rock mass has complex geological environments, and extensive joint fissure surfaces are present in tunnel excavations. The stress redistribution induced by blasting operations often triggers time-delayed rockbursts occurring within a few days to months after excavation, which are highly concealed. Intense or extremely intense rockbursts are predominantly time-delayed types, posing significant threats to safety of construction workers, equipment damage, and project delays.

A time-delayed rockburst refers to a geological disaster occurring in deep underground engineering within high geostress zones, where excavation unloading triggers stress redistribution. This process is characterized by a decrease in radial stress and increase in tangential stress within the surrounding rock of a tunnel. Following stress rebalancing, particularly under external dynamic disturbances, accumulated elastic strain energy in hard, brittle rock mass is abruptly released, leading to the rockburst phenomenon. During the occurrence of time-delayed rockbursts, there exist both temporal and spatial hysteresis effects, making the prediction of rockbursts particularly challenging. Domestic and foreign scholars have conducted research from various perspectives on rockburst mechanisms, rockburst classification, and rockburst prediction. Rockburst prediction can not only serve as a critical prerequisite for ensuring safe construction in underground engineering, but also provide a reference basis for support systems and prevention measures. Current rockburst prediction methods primarily include rockburst prediction based on theoretical criterion, rockburst prediction based on case analyses, and criterion based on site monitoring. However, none of these methods have yet to take into account the influence of joint and fault combinations on time-delayed rockbursts.

Time-delayed rockbursts typically occur at a certain distance behind the tunnel face, and its occurrence time is difficult to determine. It is generally not within the site rockburst monitoring range. Consequently, rockburst prediction methods based on site monitoring, such as acoustic emission and microseismic monitoring, are unable to provide accurate early warning for time-delayed rockbursts in the same way as for instantaneous rockbursts.

Evaluation systems such as rockburst prediction based on theoretical criterion and rockburst prediction based on case analyses primarily include parameter indices such as uniaxial tensile strength, uniaxial compressive strength, brittleness index, stress-strength ratio, and strength-stress ratio. Main prediction methods include Hoek criterion, Barton criterion, Russense criterion, and Tao Zhenyu criterion. The aforementioned rockburst prediction methods fail to incorporate the influence of principal directions of initial geostress on time-delayed rockburst hazards, while neglecting the mechanism of action of structural discontinuity configurations and combinations thereof in the nucleation process of time-delayed rockbursts.

Extremely intense rockbursts are often induced by the cutting of multiple sets of structural discontinuities.

The relative sliding modes of structural discontinuities and their interaction with the maximum principal stress are important factors that contribute to the occurrence of large-scale time-delayed rockburst disasters.

Therefore, through early identification and statistical analysis of geological structures during tunnel excavation, monitoring of information about structural discontinuities near the tunnel face, analysis of the types of structures and the occurrence of structural discontinuities, and understanding of the development and evolution laws of geological disasters in tunnel zones prone to rockbursts, a data support is provided for the prevention and control of subsequent time-delayed rockburst disasters. During tunnel construction, the early warning work for time-delayed rockburst disasters is relatively lagging and insufficient, causing the failure to seize the optimal timing for handling the time-delayed rockburst on site. By collecting information about engineering geological conditions during the excavation of the tunnel, conducting excavation simulations under different combinations of structural discontinuities, and summarizing the rules of geological structures when rockburst damage occurs through numerical calculations, a reference basis is provided for the early warning of time-delay strong rockbursts, which is of great significance for the prevention and control of as well as the mechanism research on the time-delay rockburst disasters.

SUMMARY OF THE INVENTION

In view of shortcomings in the prior art, the present invention provides a method for judging geology of a time-delayed extremely intense rockburst.

A method for judging geology of a time-delayed extremely intense rockburst specifically includes the following steps:

Step 1: analyzing engineering geological conditions of each cyclic excavation mileage section of a tunnel face, wherein step 1 specifically includes:

Step 1.1: performing on-site recording of geological information ahead of the tunnel face in a construction tunnel during each excavation cycle, wherein the geological information comprises lithology, a topographical burial depth, integrity of a surrounding rock, quality grading of the surrounding rock, a weathering degree of the surrounding rock, a water seepage condition, a groundwater development condition, and a joint development degree.

Step 1.2: performing geological mapping on conditions of the surrounding rock exposed at the tunnel face after tunnel excavation.

Step 1.3: performing advanced geological prediction on tunnel engineering geology by using a seismic reflection method, and collecting propagation velocity information through a high-precision receiver based on seismic waves generated by excitation holes arranged for each cyclic excavation mileage section of the tunnel face.

Step 1.4: processing seismic wave collection data by using an advanced geological prediction system AmbergTSPPlus to obtain time profiles, depth migration profiles, physical and mechanical parameters, and rock reflection horizons of P waves, SH waves, and SV waves ahead of the tunnel face.

Step 1.5: based on the seismic wave data collected by the advanced geological prediction system AmbergTSP-Plus in step 1.4, predicting geological conditions ahead of the tunnel face comprising fractures, karst caves, faults, soft strata, and water-rich cases to timely acquire engineering information of unfavorable geological bodies in the surrounding rock ahead of the tunnel face.

Step 1.6: recording geological structural conditions of each cyclic excavation mileage section of the tunnel face, and judging a correlation between occurrence of a rockburst and rockburst intensity levels and spatial position relations of structural discontinuities and spatial combination forms of the structural discontinuities, wherein the geological structural conditions specifically comprise quantities of the structural discontinuities, types of the structural discontinuities, spacings between the structural discontinuities, positions of the structural discontinuities, orientations of the structural discontinuities, apertures of the structural discontinuities, infilling conditions of the structural discontinuities, trace lengths of the structural discontinuities, and forms of intersection between the structural discontinuities and a tunnel.

Step 2: analyzing morphology and characteristics of a burst crater in a rockburst-damaged zone.

Step 2.1: describing a tunnel rockburst situation in real time, recording a rockburst occurrence process, and recording the morphology of the burst crater in the rockburst-damaged zone, and analyzing characteristics of the rockburst, including: determining the spatiotemporal types and mechanism types of the rockburst, determining a rockburst level based on a rockburst scale, recording the rockburst occurrence process and acoustic characteristics during the rockburst occurrence process, and a stake mark range at a fault surface and the burst crater, a size of the burst crater, an ejection distance of a burst piece, a maximum depth of the burst crater, morphology of burst rock, an area of the fault surface, and a volume of the burst crater, and judging a correlation between the morphology and range of the burst crater and spatial position relations of the structural discontinuities and spatial combination forms of the structural discontinuities, Step 2.2: performing advanced geological drilling on a rockburst-damaged fault surface, and based on drilling results within a hole, recording information about geological structural conditions in the rockburst-damaged zone, wherein the information comprises rock powder generated during drilling, a rotation velocity, occurrence of drill bit jamming, vibration of a drill rod, proved lithology, hardness, a weathering degree, integrity of a rock mass, roughness of the structural discontinuities, opening and filling conditions of the structural discontinuities, an exposure state of the rock mass and groundwater development conditions.

Step 2.3: conducting overbreak-underbreak analysis on the rockburst-damaged zone in a tunnel by using a profile scanning technology, recording an overbreak area and an underbreak area, a maximum overbreak location, a maximum underbreak location, and a linear average overbreak of the burst crater, and identifying morphological characteristics, boundaries, depths and a damage distribution range of the burst crater.

Step 3: analyzing a spatial distribution relationship between the burst crater and a geological structure.

Step 3.1: based on a spatial relationship between a joint orientation and a stratum orientation/dip direction in a blast crater zone, and a relative sliding relationship between a hanging wall and a foot wall of faults in the blast crater zone, analyzing characteristics of rockburst damage, and counting an occurrence frequency and an intensity level of a rockburst under an effect of the structural discontinuities with different dip directions/ angles, and under conditions of normal faults or strike-slip faults to judge a hazardous dip direction and a hazardous dip angle of the structural discontinuities and fault dislocation patterns which are prone to triggering the rockburst under a current condition.

Step 3.2: based on a spatial distribution pattern of the structural discontinuities and a positional relationship between the structural discontinuities and the tunnel, and combined with occurrence characteristics and development characteristics of the structural discontinuities, further analyzing rockburst damage characteristics through statistics and observations of a rockburst site to determine locations of developed structural discontinuities in each cyclic excavation mileage section of the tunnel face where the rockburst is more prone to occur; a positional relationship where the structural discontinuities are parallel, perpendicular, oblique, and at an oblique intersection angle with the tunnel where the rockburst is more prone to occur; and a dip direction, a dip angle, a spacing, and a trace length of the structural discontinuities when the rockburst is more prone to occur.

Step 3.3: based on rockburst damage information under different geological conditions, preliminarily judging a risk of time-delayed extremely intense rockburst disasters which occur along with exposure of cavities with different structural characteristics after the tunnel face is excavated when the following parameters in step 3.2 emerge in the tunnel face during each cyclic excavation mileage section: a hazardous position of the structural discontinuities, a hazardous intersection pattern of the structural discontinuities, a hazardous dip direction of the structural discontinuities, a hazardous dip angle of the structural discontinuities, a hazardous spacing of the structural discontinuities, and a hazardous trace length of the structural discontinuities.

Step 4: conducting three-dimensional (3D) geostress measurement on a tunnel rockburst zone.

Step 4.1: determining a number, a location, and a hole depth of geostress measurement points based on the geological structure of the tunnel rockburst zone.

Step 4.2: determining a 3D geostress state of the rockburst zone by using a stress relief method or a hydraulic fracturing method, drilling at measurement points of a rock mass, attaching a strain sensor at a hole bottom, drilling out a rock core to fully unload a hole bottom plane, calculating a stress state at the hole bottom plane by obtaining a recovery strain of the unloaded plane and an elastic constant of a rock, sealing two ends of a tested rock stratum by using a packer, injecting high-pressure water into the packer from two ends thereof to induce fractures on two walls of the drilled rock, applying pressure in several cycles, and determine a stress state of an original rock according to pump pressure values and orientations of the induced fractures.

Step 4.3: determining a relationship between an orientation of a maximum principal stress and spatial distribution of the structural discontinuities in the rockburst-damaged zone, wherein the relationship comprises perpendicular, parallel, oblique, and at an oblique intersection angle.

Step 5: judging a geological condition of the time-delayed extremely intense rockburst.

Step 5.1: judging the geological condition of the time-delayed extremely intense rockburst.

Based on geostress measurement results from step 4, and combined with physical and mechanical parameters of the rock and the structural discontinuities obtained through on-site geological investigations in step 1 to step 3, establishing a 3D numerical simulation tunnel model by using a discrete element software.

The 3D numerical simulation tunnel model described is an elastoplastic plane strain model, wherein under a loading effect of the surrounding rock, a transverse displacement of a tunnel is greater than a longitudinal displacement thereof; upon the tunnel excavation, an equilibrium state of initial rock stress is disrupted, causing displacement in the surrounding rock and re-adjustment in the rock mass of the tunnel, wherein an influence range of stress redistribution is 3-5 times a tunnel diameter, meaning that a geometric dimension of the numerical simulation model is within 3-5 times the tunnel diameter; an upper boundary of the tunnel is subject to excavation unloading, so that constraints in a vertical direction are released, and an upper part of the tunnel model is unconstrained; left and right boundaries of the tunnel are subject to constraints in a horizontal direction; a lower boundary of the tunnel is subject to constraints in the horizontal direction and the vertical direction; based on practical tunnel engineering conditions, a tunnel shape, a tunnel width, and a tunnel height are determined to establish the numerically-simulating geometric model; tunnel excavation simulation is conducted for the different combinations of the structural discontinuities in each cyclic excavation mileage section of the tunnel face, the different combinations include combinations of multiple joint sets, combinations of multiple fault sets, and combinations of joints-faults; the physical and mechanical parameters of the structural discontinuities in the model comprise positions of the structural discontinuities, dip directions of the structural discontinuities, dip angles of the structural discontinuities, spacings of the structural discontinuities and spatial position relationships between orientations of the structural discontinuities and tunnel axes, comprising perpendicular, parallel, oblique, and at an oblique intersection angle; and by establishing the numerically-simulating geometric model under the different combinations of the structural discontinuities, obtaining a principal stress vector diagram and a maximum principal stress diagram of a two-dimensional (2D) elasto-plastic plane strain model to further gain the maximum principal stress values and a high-stress zone, evaluating a potential risk of tunnel rockburst based on both the maximum principal stress values and stress concentration situations, conducting verification by combining with combinations of the structural discontinuities exposed when a rockburst occurs during actual tunnel excavation, and calculating a frequency of rockburst occurring during actual tunnel excavation based on following parameters which exhibit high principal stress values and stress concentration and are obtained through numerical calculation: spatial position combination of hazardous structural discontinuities, position of hazardous structural discontinuities, dip directions of hazardous structural discontinuities, dip angles of hazardous structural discontinuities, spacings between hazardous structural discontinuities.

Step 5.2: based on the initial geostress measurement results and the physical and mechanical parameters of the rock and the structural discontinuities obtained through the on-site geological investigations, establishing a numerically-simulating geometric model under different combinations of the structural discontinuities including combinations of multiple joint sets, combinations of multiple fault sets, and combinations of joints-faults and the corresponding physical and mechanical parameters of the structural discontinuities including positions of the structural discontinuities, spacing of the structural discontinuities, lengths of the structural discontinuities, dip directions of the structural discontinuities, and dip angles of the structural discontinuities, obtaining the principal stress vector diagram and a maximum principal stress nephogram of the tunnel model under different working conditions by using a discrete element numerical simulation software to obtain stress concentration situations and maximum principal stress values upon tunnel excavation, thereby obtaining a hazardous spatial position combination of the structural discontinuities, a hazardous position of the structural discontinuities, a hazardous spacing of the structural discontinuities, a hazardous length of the structural discontinuities, a hazardous dip direction of the structural discontinuities, and a hazardous dip angle of the structural discontinuities, and judging a risk of subsequent time-delayed rockburst disasters on a basis of taking states of a surrounding rock exposed and conditions of exposed structural discontinuities at a current tunnel face in an excavation zone, in combination with numerical calculation results of the geometric model under conditions of different structural discontinuities.

By adoption of the above technical solution, the present invention has the following beneficial effects:

The present invention provides a method for judging geology of a time-delayed extremely intense rockburst. According to the method, the risk of time-delayed extremely intense rockburst disasters occurring after excavation at a current position of the tunnel face is determined by analyzing the spatial positional relationships among the tunnel face, structural discontinuities, rockburst-damaged zones, boundaries, and the orientation of maximum principal stress. By adopting corresponding prevention and control measures for different geological structural conditions, engineering risks can be mitigated to a certain extent, economic performance can be enhanced, and the safety of construction personnel can be ensured. The method demonstrates significant application value for underground engineering projects prone to frequent rockburst disasters.

BRIEF DESCRIPTION OF THE DRAWINGS

FIG. 1 is a schematic flowchart of a method for judging geology of a time-delayed extremely intense rockburst according to an embodiment of the present invention.

FIG. 2 is a schematic diagram showing information statistics of structural discontinuities in the vicinity of a tunnel face according to an embodiment of the present invention, wherein FIG. 2(a) shows large-scale faults near an excavation boundary; FIG. 2(b) shows moderate-scale structural discontinuities near the excavation boundary; and FIG. 2(c) shows small-scale fractures near the excavation boundary.

FIG. 3 is a schematic diagram showing spatial positions of structural discontinuities near a tunnel face according to an embodiment of the present invention, wherein FIG. 3(a) shows the structural discontinuities are perpendicular to both a sidewall and a tunnel face; FIG. 3(b) shows the structural discontinuities are parallel to the sidewall and perpendicular to the tunnel face; and FIG. 3(c) shows the structural discontinuities are perpendicular to the sidewall and parallel to the tunnel face.

FIG. 7 is a schematic diagram showing stress on structural discontinuities parallel to a sidewall and perpendicular to a tunnel face according to an embodiment of the present invention, wherein FIG. 7(a) is a schematic diagram showing a direction of a maximum principal stress on a normal fault parallel to the sidewall and perpendicular to the tunnel face; and FIG. 7(b) is a schematic diagram showing a direction of a maximum principal stress on a strike-slip fault parallel to the sidewall and perpendicular to the tunnel face.

FIG. 8 is a schematic diagram showing stress on structural discontinuities perpendicular to a sidewall and parallel to a tunnel face according to an embodiment of the present invention, wherein FIG. 8(a) is a schematic diagram showing a direction of a maximum principal stress on a normal fault perpendicular to the sidewall and parallel to the tunnel face; and FIG. 8(b) is a schematic diagram showing a direction of a maximum principal stress on a strike-slip fault perpendicular to the sidewall and parallel to the tunnel face.

FIG. 9 is a schematic diagram showing stress on structural discontinuities perpendicular to a sidewall and perpendicular to a tunnel face according to an embodiment of the present invention, wherein FIG. 9(a) is a schematic diagram showing a direction of a maximum principal stress on a normal fault perpendicular to the sidewall and perpendicular to the tunnel face; and FIG. 9(b) is a schematic diagram showing a direction of a maximum principal stress on a strike-slip fault perpendicular to the sidewall and perpendicular to the tunnel face.

DETAILED DESCRIPTION OF THE EMBODIMENTS

Figure 2:
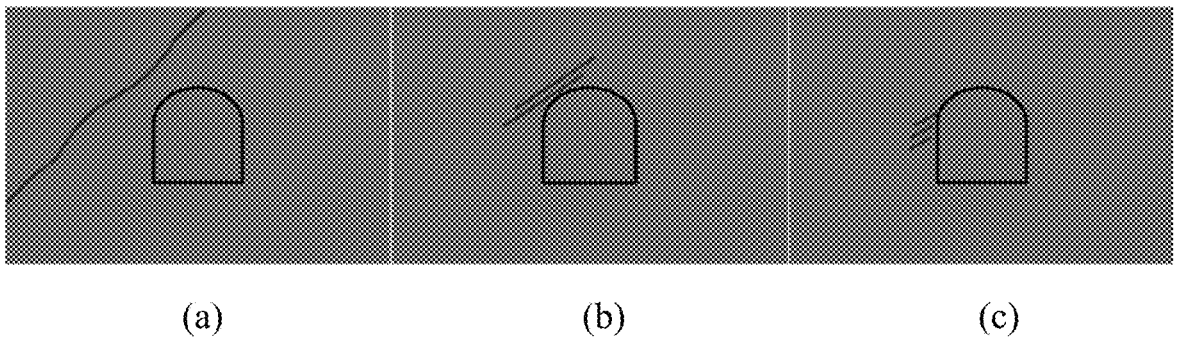

The specific implementations of the present invention are described in more detail below with reference to the accompanying drawings and examples. The following embodiments are intended to illustrate the present invention, and should not be construed as a limitation of the scope of the present invention.

A method for judging geology of a time-delayed extremely intense rockburst includes: analyzing the spatial positional relationships among the tunnel face, structural discontinuities, rockburst-damaged zones, and the orientation of maximum principal stress, establishing a corresponding 3D geological model to conduct simulated excavation on the geological tunnel model under the different combinations of structural discontinuities, and judging the risk of time-delayed extremely intense rockburst disasters occurring after excavation at a current position of the tunnel face through numerical calculation results. As shown in FIG. 1, the method specifically includes the following steps:

Step 1: analyzing engineering geological conditions of each cyclic excavation mileage section of a tunnel face, wherein step 1 specifically includes:

Step 1.1: performing on-site recording of geological information ahead of the tunnel face in a construction tunnel during each excavation cycle, wherein the geological information comprises lithology, a topographical burial depth, integrity of a surrounding rock, quality grading of the surrounding rock, a weathering degree of the surrounding rock, a water seepage condition, a groundwater development condition, and a joint development degree.

Step 1.2: performing geological mapping on conditions of the surrounding rock exposed at the tunnel face after tunnel excavation.

Step 1.3: performing advanced geological prediction on tunnel engineering geology by using a seismic reflection method, and collecting propagation velocity information through a high-precision receiver based on seismic waves generated by excitation holes arranged for each cyclic excavation mileage section of the tunnel face.

Step 1.4: processing seismic wave collection data by using an advanced geological prediction system AmbergTSPPlus to obtain time profiles, depth migration profiles, physical and mechanical parameters, and rock reflection horizons of P waves, SH waves, and SV waves ahead of the tunnel face.

Step 1.5: based on the seismic wave data collected by the advanced geological prediction system AmbergTSPPlus in step 1.4, predicting geological conditions ahead of the tunnel face comprising fractures, karst caves, faults, soft strata, and water-rich cases to timely acquire engineering information of unfavorable geological bodies in the surrounding rock ahead of the tunnel face.

Step 1.6: recording geological structural conditions of each cyclic excavation mileage section of the tunnel face, and judging a correlation between occurrence of a rockburst and rockburst intensity levels and spatial position relations of structural discontinuities and spatial combination forms of the structural discontinuities, wherein the geological structural conditions specifically comprise quantities of the structural discontinuities, types of the structural discontinuities, spacings between the structural discontinuities, positions of the structural discontinuities, orientations of the structural discontinuities, apertures of the structural discontinuities, infilling conditions of the structural discontinuities, trace lengths of the structural discontinuities, and forms of intersection between the structural discontinuities and a tunnel.

Figure 3:
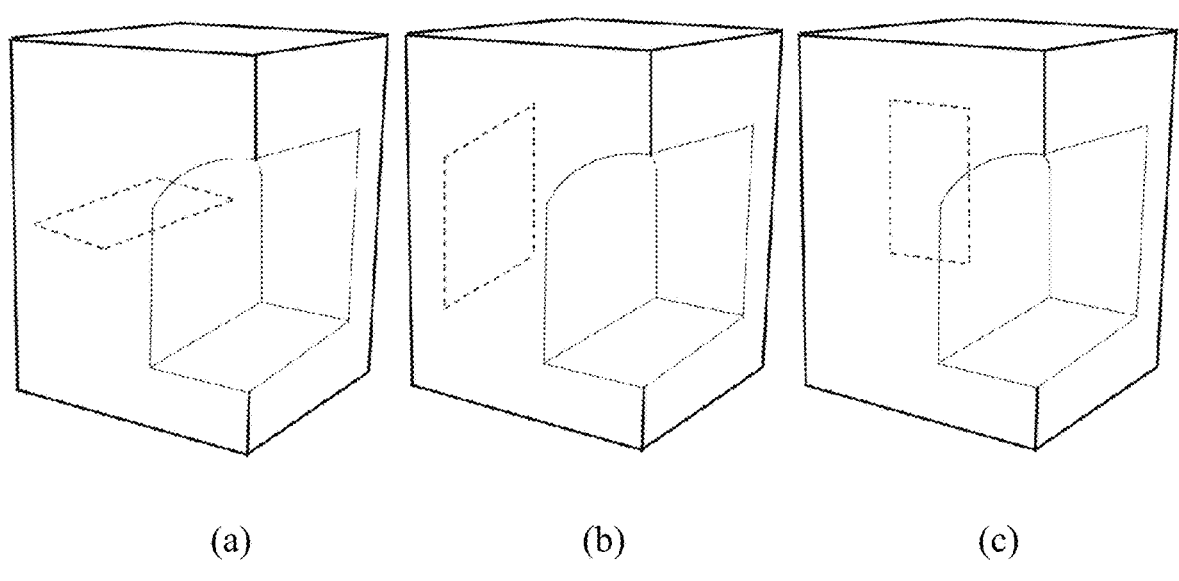
Figure 4:
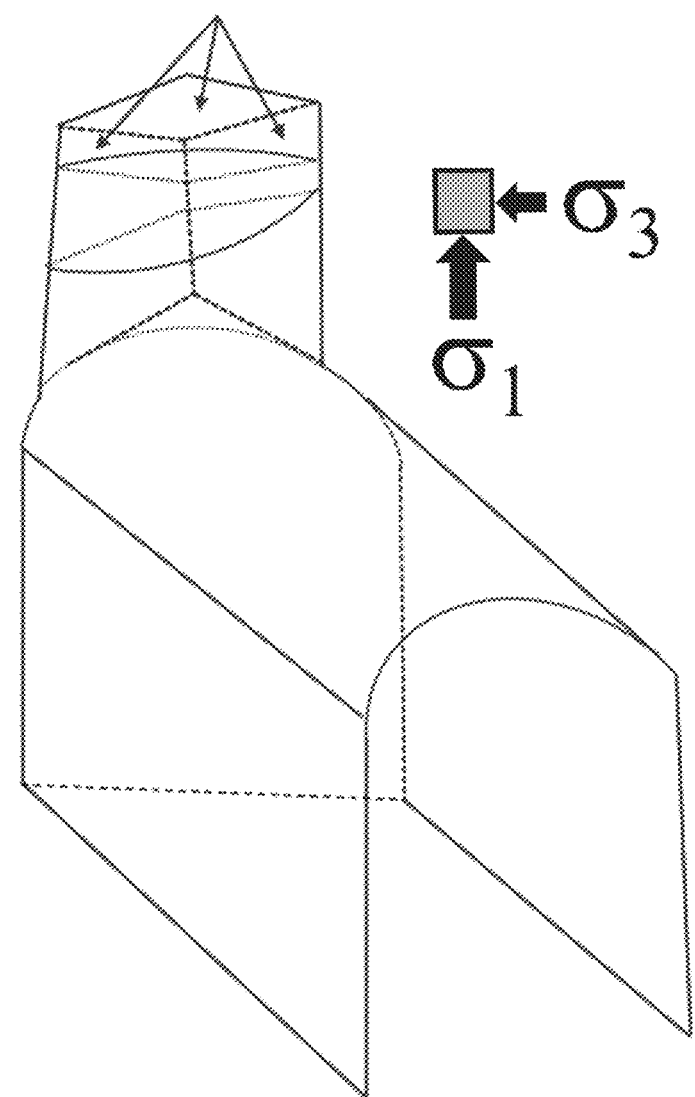
FIG. 4 shows rockburst patterns formed by combined cutting of multiple sets of faults according to an embodiment of the present invention.
Figure 5:
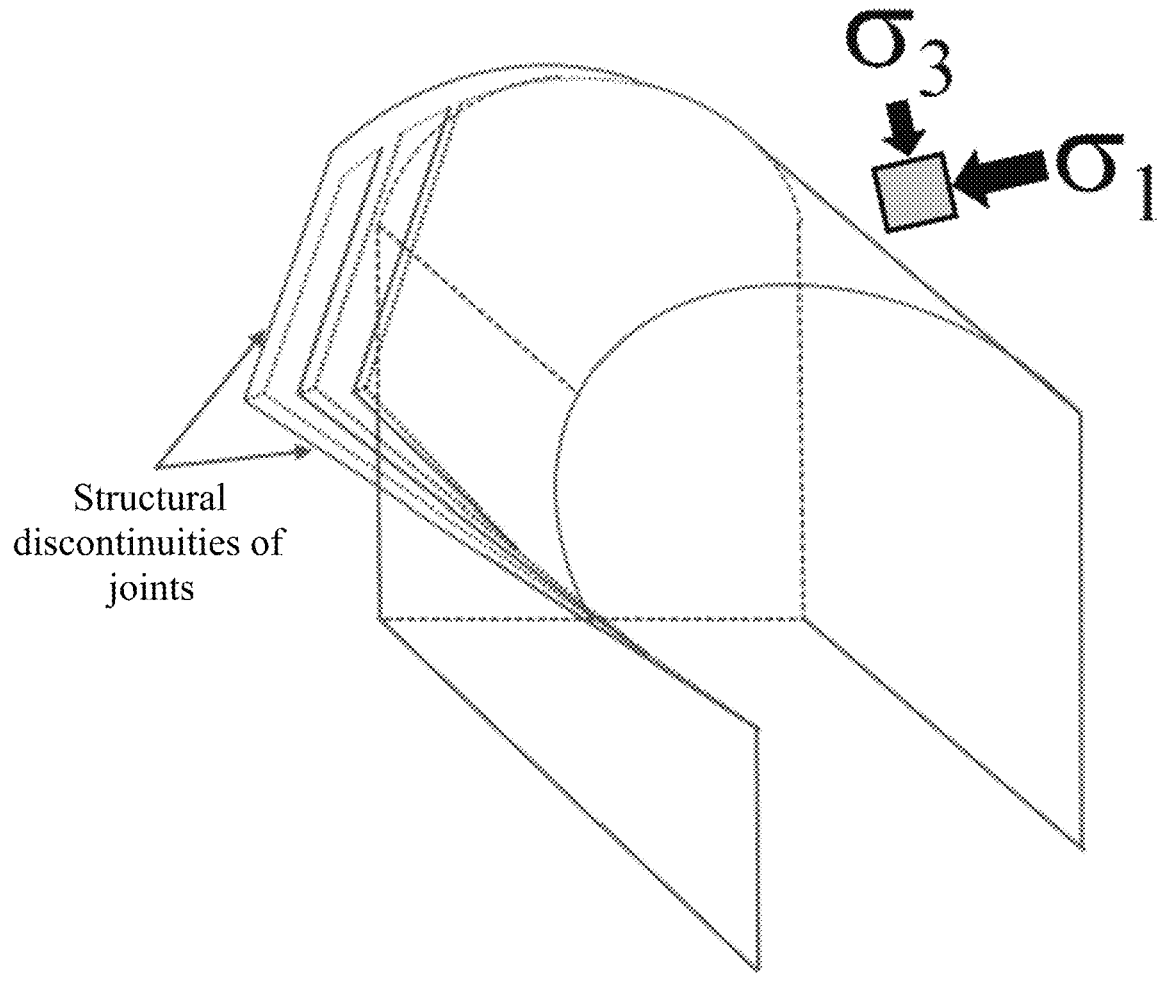
FIG. 5 shows rockburst patterns formed by combined cutting of multiple sets of joints according to an embodiment of the present invention.
Figure 6:
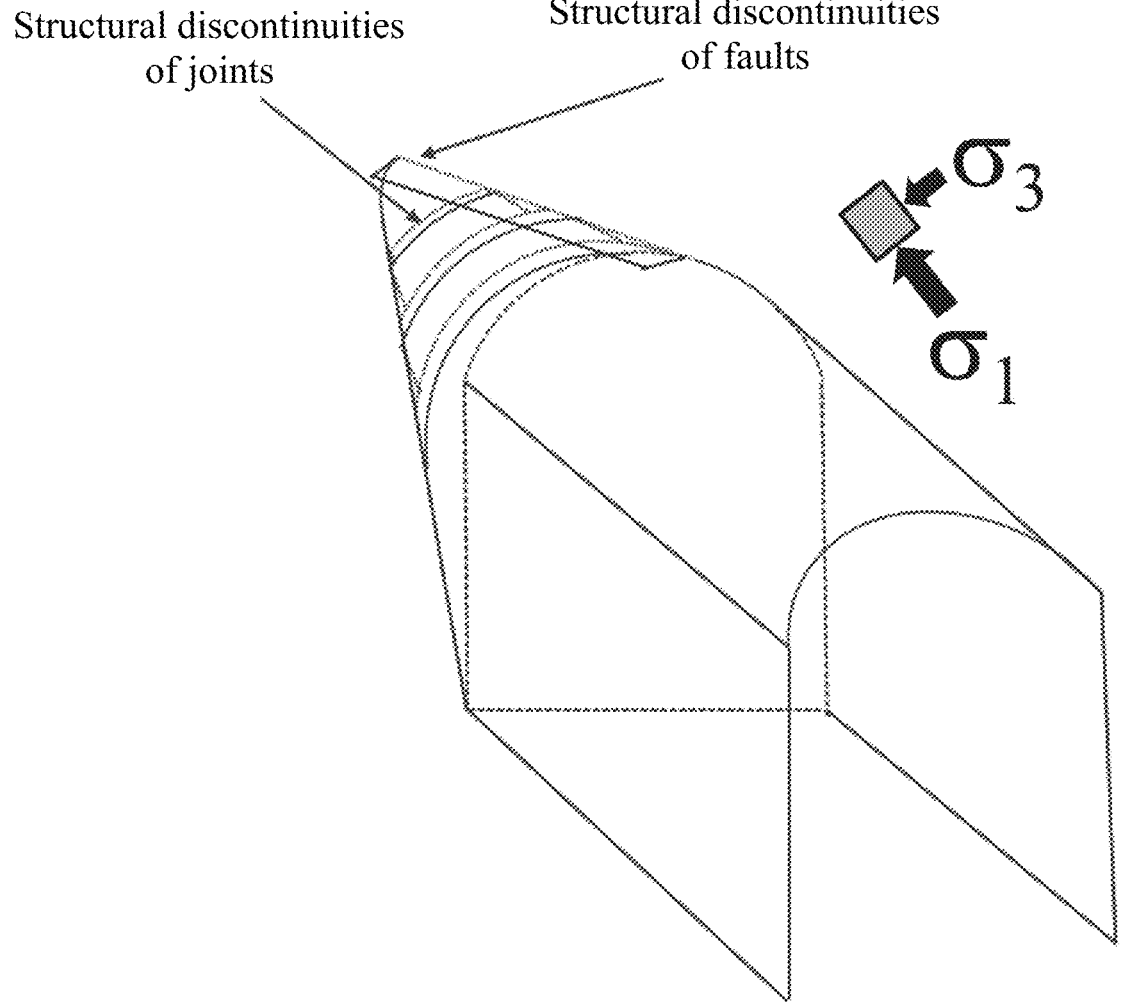
FIG. 6 shows rockburst patterns formed by combined cutting of joints-faults according to an embodiment of the present invention.

In this embodiment, geological information conditions of rock mass in a construction area are obtained according to methods such as geological mapping and advanced geological prediction of the tunnel face. As shown in FIG. 2, statistical analysis is conducted on the types, quantities, distribution ranges, etc., of structural discontinuities in an area near the tunnel face after tunnel excavation. The distribution of structural discontinuities relative to the sidewalls and the tunnel face after tunnel excavation is determined, as shown in FIG. 3. Based on advanced geological drilling and profile scanning technology, the stratum lithology, geological structures, rockburst-damaged extent, and boundaries of rockburst-damaged zones are recorded, thereby enabling the analysis of spatial position relationships between burst craters, the tunnel face, and the structural discontinuities. The combined cutting patterns of the structural discontinuities relative to the burst craters are recorded, including: rockburst patterns formed by combined cutting of multiple sets of faults (FIG. 4), rockburst patterns formed by combined cutting of multiple sets of joints (FIG. 5), and rockburst patterns formed by combined cutting of multiple sets of joints-faults (FIG. 6), which can be used as the basis for risk judgment of a current excavation zone. Additionally, a 3D geological model under corresponding conditions is established to preliminarily judge the risk of a time-delayed extremely intense rockburst.

Step 2: analyzing morphology and characteristics of a burst crater in a rockburst-damaged zone.

Step 2.1: describing a tunnel rockburst situation in real time, recording a rockburst occurrence process, and recording the morphology of the burst crater in the rockburst-damaged zone, and analyzing characteristics of the rockburst, including: determining the spatiotemporal types and mechanism types of the rockburst, determining a rockburst level based on a rockburst scale, recording the rockburst occurrence process and acoustic characteristics during the rockburst occurrence process, and a stake mark range at a fault surface and the burst crater, a size of the burst crater, an ejection distance of a burst piece, a maximum depth of the burst crater, morphology of burst rock, an area of the fault surface, and a volume of the burst crater, and judging a correlation between the morphology and range of the burst crater and spatial position relations of the structural discontinuities and spatial combination forms of the structural discontinuities.

Step 2.2: performing advanced geological drilling on a rockburst-damaged fault surface, and based on drilling results within a hole, recording information about geological structural conditions in the rockburst-damaged zone, wherein the information comprises rock powder generated during drilling, a rotation velocity, occurrence of drill bit jamming, vibration of a drill rod, proved lithology, hardness, a weathering degree, integrity of a rock mass, roughness of the structural discontinuities, opening and filling conditions of the structural discontinuities, an exposure state of the rock mass and groundwater development conditions.

Step 2.3: conducting overbreak-underbreak analysis on the rockburst-damaged zone in a tunnel by using a profile scanning technology, recording an overbreak area and an underbreak area, a maximum overbreak location, a maximum underbreak location, and a linear average overbreak of the burst crater, and identifying morphological characteristics, boundaries, depths and a damage distribution range of the burst crater.

Step 3: analyzing a spatial distribution relationship between the burst crater and a geological structure.

Step 3.1: based on a spatial relationship between a joint orientation and a stratum orientation/dip direction in a blast crater zone, and a relative sliding relationship between a hanging wall and a foot wall of faults in the blast crater zone, analyzing characteristics of rockburst damage, and counting an occurrence frequency and an intensity level of a rockburst under an effect of the structural discontinuities with different dip directions/angles, and under conditions of normal faults or strike-slip faults to judge a hazardous dip direction and a hazardous dip angle of the structural discontinuities and fault dislocation patterns which are prone to triggering the rockburst under a current condition.

Step 3.2: based on a spatial distribution pattern of the structural discontinuities and a positional relationship between the structural discontinuities and the tunnel, and combined with occurrence characteristics and development characteristics of the structural discontinuities, further analyzing rockburst damage characteristics through statistics and observations of a rockburst site to determine locations of developed structural discontinuities in each cyclic excavation mileage section of the tunnel face where the rockburst is more prone to occur; a positional relationship where the structural discontinuities are parallel, perpendicular, oblique, and at an oblique intersection angle with the tunnel where the rockburst is more prone to occur; and a dip direction, a dip angle, a spacing, and a trace length of the structural discontinuities when the rockburst is more prone to occur.

Step 3.3: based on rockburst damage information under different geological conditions, preliminarily judging a risk of time-delayed extremely intense rockburst disasters which occur along with exposure of cavities with different structural characteristics after the tunnel face is excavated when the following parameters in step 3.2 emerge in the tunnel face during each cyclic excavation mileage section: a hazardous position of the structural discontinuities, a hazardous intersection pattern of the structural discontinuities, a hazardous dip direction of the structural discontinuities, a hazardous dip angle of the structural discontinuities, a hazardous spacing of the structural discontinuities, and a hazardous trace length of the structural discontinuities.

Figure 7:
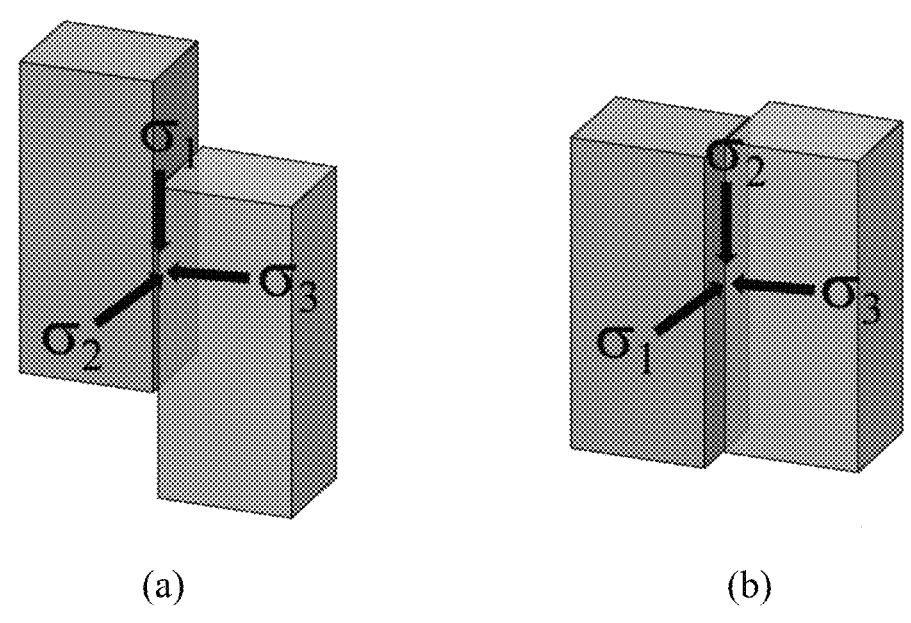
Figure 8:
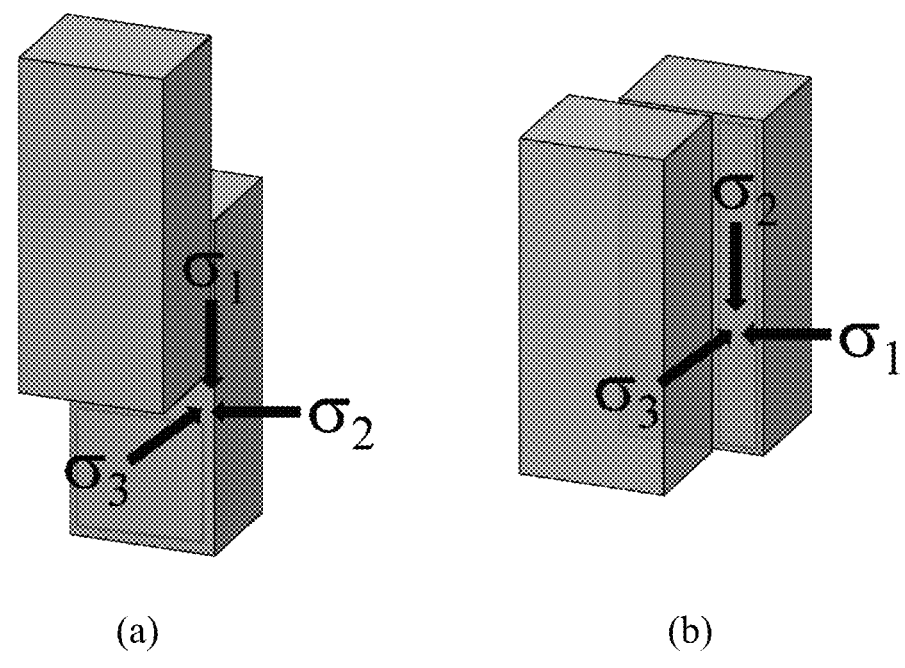
Figure 9:
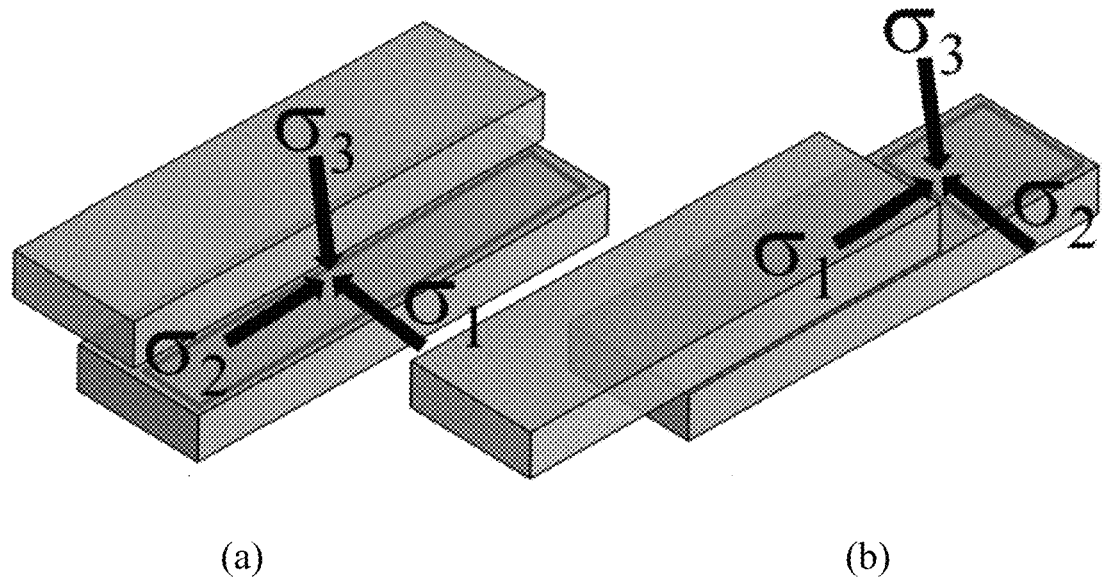

In this embodiment, the number of geostress measurement points is determined based on complexity of geological structures of on-site rockburst-damaged zones. A 3D geostress state of a rockburst-damaged zone is determined by using a stress relief method or a hydraulic fracturing method. Through measurements of the 3D geostress in the rockburst-damaged zone, the spatial positional distribution relationship between the structural discontinuities and the orientation of the maximum principal stress is determined. As shown in FIG. 7, FIG. 8, and FIG. 9, the risk of subsequent time-delayed rockburst disasters in the current excavation area is further judged by analyzing the spatial positional relationship between the relative sliding direction of the structural discontinuities and the orientation of the maximum principal stress. A 3D geological model of tunnel excavation is established by integrating geological mapping, advanced geological drilling, and advanced geological prediction; based on geological structural conditions and geostress field conditions, 3D numerical simulation of tunnel excavation is performed to analyze deformation characteristics, stress characteristics, and elastic strain energy characteristics of the surrounding rock of the tunnel under different combinations of various structural discontinuities, so as to judge the types, locations and combinations of the structural discontinuities with a potential risk of time-delayed extremely intense rockburst disasters.

Step 4: conducting three-dimensional (3D) geostress measurement on a tunnel rockburst zone.

Step 4.1: determining a number, a location, and a hole depth of geostress measurement points based on geological structures of the tunnel rockburst zone.

Step 4.2: determining a 3D geostress state of the rockburst zone by using a stress relief method or a hydraulic fracturing method, drilling at measurement points of a rock mass, attaching a strain sensor at a hole bottom, drilling out a rock core to fully unload a hole bottom plane, calculating a stress state at the hole bottom plane by obtaining a recovery strain of the unloaded plane and an elastic constant of a rock, sealing two ends of a tested rock stratum by using a packer, injecting high-pressure water into the packer from two ends thereof to induce fractures on two walls of the drilled rock, applying pressure in several cycles, and determine a stress state of an original rock according to pump pressure values and orientations of the induced fractures.

Step 4.3: determining a relationship between an orientation of a maximum principal stress and spatial distribution of the structural discontinuities in the rockburst-damaged zone, wherein the relationship comprises perpendicular, parallel, oblique, and at an oblique intersection angle.

Step 5: judging a geological condition of the time-delayed extremely intense rockburst.

Step 5.1: judging the geological condition of the time-delayed extremely intense rockburst.

Based on geostress measurement results from step 4, and combined with physical and mechanical parameters of the rock and the structural discontinuities obtained through on-site geological investigations in step 1 to step 3, establishing a 3D numerical simulation tunnel model by using a discrete element software.

The 3D numerical simulation tunnel model described is an elastoplastic plane strain model, wherein under a loading effect of the surrounding rock, a transverse displacement of a tunnel is greater than a longitudinal displacement thereof; upon the tunnel excavation, an equilibrium state of initial rock stress is disrupted, causing displacement in the surrounding rock and re-adjustment in the rock mass of the tunnel, wherein an influence range of stress redistribution is 3-5 times a tunnel diameter, meaning that a geometric dimension of the numerical simulation model is within 3-5 times the tunnel diameter; an upper boundary of the tunnel is subject to excavation unloading, so that constraints in a vertical direction are released, and an upper part of the tunnel model is unconstrained; left and right boundaries of the tunnel are subject to constraints in a horizontal direction; a lower boundary of the tunnel is subject to constraints in the horizontal direction and the vertical direction; based on practical tunnel engineering conditions, a tunnel shape, a tunnel width, and a tunnel height are determined to establish the numerically-simulating geometric model; tunnel excavation simulation is conducted for the different combinations of the structural discontinuities in each cyclic excavation mileage section of the tunnel face, the different combinations include combinations of multiple joint sets, combinations of multiple fault sets, and combinations of joints-faults; the physical and mechanical parameters of the structural discontinuities in the model comprise positions of the structural discontinuities, dip directions of the structural discontinuities, dip angles of the structural discontinuities, spacings of the structural discontinuities and spatial position relationships between orientations of the structural discontinuities and tunnel axes, comprising perpendicular, parallel, oblique, and at an oblique intersection angle; and by establishing the numerically-simulating geometric model under the different combinations of the structural discontinuities, obtaining a principal stress vector diagram and a maximum principal stress diagram of a two-dimensional (2D) elasto-plastic plane strain model to further gain the maximum principal stress values and a high-stress zone, evaluating a potential risk of tunnel rockburst based on both the maximum principal stress values and stress concentration situations, conducting verification by combining with combinations of the structural discontinuities exposed when a rockburst occurs during actual tunnel excavation, and calculating a frequency of rockburst occurring during actual tunnel excavation based on following parameters which exhibit high principal stress values and stress concentration and are obtained through numerical calculation: spatial position combination of hazardous structural discontinuities, position of hazardous structural discontinuities, dip directions of hazardous structural discontinuities, dip angles of hazardous structural discontinuities, spacings between hazardous structural discontinuities.

Step 5.2: based on the initial geostress measurement results and physical and mechanical parameters of the rock and the structural discontinuities obtained through the on-site geological investigations, establishing a numerically-simulating geometric model under different combinations of the structural discontinuities including combinations of multiple joint sets, combinations of multiple fault sets, and combinations of joints-faults and the corresponding physical and mechanical parameters of structural discontinuities including positions of the structural discontinuities, spacing of the structural discontinuities, lengths of the structural discontinuities, dip directions of the structural discontinuities, and dip angles of the structural discontinuities, obtaining the principal stress vector diagram and a maximum principal stress nephogram of the tunnel model under different working conditions by using a discrete element numerical simulation software to obtain stress concentration situations and maximum principal stress values upon tunnel excavation, thereby obtaining a hazardous spatial position combination of the structural discontinuities, a hazardous position of structural discontinuities, a hazardous spacing of the structural discontinuities, a hazardous length of the structural discontinuities, a hazardous dip direction of the structural discontinuities, and a hazardous dip angle of the structural discontinuities, and judging a risk of subsequent time-delayed rockburst disasters on a basis of taking states of a surrounding rock exposed and conditions of exposed structural discontinuities at a current tunnel face in an excavation zone, in combination with numerical calculation results of the geometric model under conditions of different structural discontinuities. In this embodiment, deformation characteristics, stress characteristics, and elastic strain energy characteristics under combined cutting patterns of structural discontinuities occurring on site are analyzed through numerical simulation results of tunnel excavation under different combinations of structural discontinuities. By correlating the analysis with on-site rockburst occurrences in the current excavation zone for verification, which combined cutting of structural discontinuities for the tunnel exhibits a relatively higher risk of time-delayed intense rockburst disasters is further determined. According to the method for judging geology of a time-delayed extremely intense rockburst, the risk of time-delayed rockburst disasters at a current position is judged based on geological conditions of the surrounding rock exposed after tunnel excavation. Structural discontinuity cutting combinations with a high risk during tunnel excavation are evaluated through numerical simulation calculation of tunnel excavation under different combinations of structural discontinuities, support design schemes are adjusted timely, and the capacity of a support system in high-risk zones prone to time-delayed extremely intense rockbursts is properly enhanced, which effectively avoids the risk of the time-delayed extremely intense rockbursts to a certain extent, and enhances construction safety and operational efficiency in tunneling operations while ensuring safety of construction workers and equipment.

The above description is merely an illustration of preferred embodiments of the present disclosure and the technical principle in use. Those skilled in the art should understand that, the scope of invention referred to in the embodiments of the present disclosure is not limited to the technical solution formed by a specific combination of the foregoing technical features, but should cover other technical solutions formed by any combination of the foregoing technical features or equivalent features thereof without departing from the foregoing inventive concept, for example, a technical solution formed by replacing the foregoing feature with a technical feature having a similar function disclosed in (but not limited to) the embodiments of the present disclosure.

The invention claimed is:

1. A method for judging geology of a time-delayed extremely intense rockburst, comprising the following steps:

step 1: analyzing engineering geological conditions of each cyclic excavation mileage section of a tunnel face;

wherein step 1 comprises:

step 1.1: performing on-site recording of geological information ahead of the tunnel face in a construction tunnel during each excavation cycle, wherein the geological information comprises lithology, a topographical burial depth, integrity of a surrounding rock, quality grading of the surrounding rock, a weathering degree of the surrounding rock, a water seepage condition, a groundwater development condition, and a joint development degree;

step 1.2: performing geological mapping on conditions of the surrounding rock exposed at the tunnel face after tunnel excavation;

step 1.3: performing advanced geological prediction on tunnel engineering geology by using a seismic reflection method, and collecting propagation velocity information through a high-precision receiver based on seismic waves generated by excitation holes arranged for each cyclic excavation mileage section of the tunnel face;

step 1.4: processing seismic wave collection data by using an advanced geological prediction system AmbergT-SPPlus to obtain time profiles, depth migration profiles, physical and mechanical parameters, and rock reflection horizons of P waves, SH waves, and SV waves ahead of the tunnel face;

step 1.5: based on the seismic wave data collected by the advanced geological prediction system AmbergTSP-Plus in step 1.4, predicting geological conditions ahead of the tunnel face comprising fractures, karst caves, faults, soft strata, and water-rich cases to timely acquire engineering information of unfavorable geological bodies in the surrounding rock ahead of the tunnel face; and step 1.6: recording geological structural conditions of each cyclic excavation mileage section of the tunnel face, and judging a correlation between occurrence of a rockburst and rockburst intensity levels and spatial position relations of structural discontinuities and spatial combination forms of the structural discontinuities, wherein the geological structural conditions comprise quantities of the structural discontinuities, types of the structural discontinuities, spacings between the structural discontinuities, positions of the structural discontinuities, orientations of the structural discontinuities, apertures of the structural discontinuities, infilling conditions of the structural discontinuities, trace lengths of the structural discontinuities, and forms of intersection between the structural discontinuities and a tunnel;

step 2: analyzing morphology and characteristics of a burst crater in a rockburst-damaged zone;

wherein step 2 comprises:

step 2.1: describing a tunnel rockburst situation in real time, recording a rockburst occurrence process, and recording the morphology of the burst crater in the rockburst-damaged zone, and analyzing characteristics of the rockburst, including: determining the spatiotemporal types and mechanism types of the rockburst, determining a rockburst level based on a rockburst scale, recording the rockburst occurrence process and acoustic characteristics during the rockburst occurrence process, and a stake mark range at a fault surface and the burst crater, a size of the burst crater, an ejection distance of a burst piece, a maximum depth of the burst crater, morphology of burst rock, an area of the fault surface, and a volume of the burst crater, and judging a correlation between the morphology and range of the burst crater and spatial position relations of the structural discontinuities and spatial combination forms of the structural discontinuities;

step 2.2: performing advanced geological drilling on a rockburst-damaged fault surface, and based on drilling results within a hole, recording information about geological structural conditions in the rockburst-damaged zone, wherein the information comprises rock powder generated during drilling, a rotation velocity, occurrence of drill bit jamming, vibration of a drill rod, proved lithology, hardness, a weathering degree, integrity of a rock mass, roughness of the structural discontinuities, opening and filling conditions of the structural discontinuities, an exposure state of the rock mass and groundwater development conditions; and step 2.3: conducting overbreak-underbreak analysis on the rockburst-damaged zone in the tunnel by using a profile scanning technology, recording an overbreak area and an underbreak area, a maximum overbreak location, a maximum underbreak location, and a linear average overbreak of the burst crater, and identifying morphological characteristics, boundaries, depths and a damage distribution range of the burst crater:

step 3: analyzing a spatial distribution relationship between the burst crater and a geological structure;

wherein step 3 comprises:

step 3.1: based on a spatial relationship between a joint orientation and a stratum orientation/dip direction in a blast crater zone, and a relative sliding relationship between a hanging wall and a foot wall of faults in the blast crater zone, analyzing characteristics of rockburst damage, and counting an occurrence frequency and the intensity level of a rockburst under an effect of the structural discontinuities with different dip directions/angles, and under conditions of normal faults or strike-slip faults to judge a hazardous dip direction and a hazardous dip angle of the structural discontinuities and fault dislocation patterns which are prone to triggering the rockburst under a current condition;

step 3.2: based on a spatial distribution pattern of the structural discontinuities and a positional relationship between the structural discontinuities and the tunnel, and combined with occurrence characteristics and development characteristics of the structural disconti- nuities, further analyzing rockburst damage characteristics through statistics and observations of a rockburst site to determine locations of developed structural discontinuities in each cyclic excavation mileage section of the tunnel face where the rockburst is more prone to occur; a positional relationship where the structural discontinuities are parallel, perpendicular, oblique, and at an oblique intersection angle with the tunnel where the rockburst is more prone to occur; and a dip direction, a dip angle, the spacing, and the trace length of the structural discontinuities when the rockburst is more prone to occur; and step 3.3: based on rockburst damage information under different geological conditions, preliminarily judging a risk of time-delayed extremely intense rockburst disasters which occur along with exposure of cavities with different structural characteristics after the tunnel face is excavated when the following parameters in step 3.2 emerge in the tunnel face during each cyclic excavation mileage section: a hazardous position of the structural discontinuities, a hazardous intersection pattern of the structural discontinuities, a hazardous dip direction of the structural discontinuities, the hazardous dip angle of the structural discontinuities, a hazardous spacing of the structural discontinuities, and a hazardous trace length of the structural discontinuities:

step 4: conducting three-dimensional (3D) geostress measurement on a tunnel rockburst zone;

wherein step 4 comprises:

step 4.1: determining a number, a location, and a hole depth of geostress measurement points based on the geological structure of the tunnel rockburst zone;

step 4.2: determining a 3D geostress state of the rockburst zone by using a stress relief method or a hydraulic fracturing method, drilling at measurement points of the rock mass, attaching a strain sensor at a hole bottom, drilling out a rock core to fully unload a hole bottom plane, calculating a stress state at the hole bottom plane by obtaining a recovery strain of the unloaded plane and an elastic constant of a rock, sealing two ends of a tested rock stratum by using a packer, injecting high-pressure water into the packer from two ends thereof to induce fractures on two walls of the drilled rock, applying pressure in several cycles, and determine a stress state of an original rock according to pump pressure values and orientations of the induced fractures; and step 4.3: determining a relationship between an orientation of a maximum principal stress and spatial distribution of structural discontinuities in the rockburst-damaged zone, wherein the relationship comprises perpendicular, parallel, oblique, and at the oblique intersection angle; and step 5: judging a geological condition of the time-delayed extremely intense rockburst;

wherein step 5 comprises:

step 5.1: judging the geological condition of the time-delayed extremely intense rockburst;

and based on geostress measurement results from step 4, and combined with physical and mechanical parameters of the rock and structural discontinuities obtained through on-site geological investigations in step 1 to step 3, establishing a 3D numerical simulation tunnel model by using a discrete element software; and step 5.2: based on the initial geostress measurement results and the physical and mechanical parameters of the rock and the structural discontinuities obtained through the on-site geological investigations, establishing a numerically-simulating geometric model under different combinations of the structural discontinuities and the corresponding physical and mechanical parameters of the structural discontinuities, obtaining a principal stress vector diagram and a maximum principal stress nephogram of the tunnel model under different working conditions by using a discrete element numerical simulation software to obtain stress concentration situations and maximum principal stress values upon tunnel excavation, thereby obtaining a hazardous spatial position combination of the structural discontinuities, the hazardous position of the structural discontinuities, the hazardous spacing of the structural discontinuities, a hazardous length of the structural discontinuities, the hazardous dip direction of the structural discontinuities, and the hazardous dip angle of the structural discontinuities, and judging a risk of subsequent time-delayed rockburst disasters on a basis of taking states of the surrounding rock exposed and conditions of exposed structural discontinuities at a current tunnel face in an excavation zone, in combination with numerical calculation results of the geometric model under conditions of different structural discontinuities.

2. The method for judging geology of the time-delayed extremely intense rockburst according to claim 1, wherein the 3D numerical simulation tunnel model described in step 5.1 is an elastoplastic plane strain model, wherein under a loading effect of the surrounding rock, a transverse displacement of a tunnel is greater than a longitudinal displacement thereof; upon the tunnel excavation, an equilibrium state of initial rock stress is disrupted, causing displacement in the surrounding rock and re-adjustment in a rock mass of the tunnel, wherein an influence range of stress redistribution is 3-5 times a tunnel diameter, meaning that a geometric dimension of the numerical simulation model is within 3-5 times the tunnel diameter; an upper boundary of the tunnel is subject to excavation unloading, so that constraints in a vertical direction are released, and an upper part of the tunnel model is unconstrained; left and right boundaries of the tunnel are subject to constraints in a horizontal direction; a lower boundary of the tunnel is subject to constraints in the horizontal direction and the vertical direction; based on practical tunnel engineering conditions, a tunnel shape, a tunnel width, and a tunnel height are determined to establish the numerically-simulating geometric model; tunnel excavation simulation is conducted for the different combinations of the structural discontinuities in each cyclic excavation mileage section of the tunnel face, the different combinations include combinations of multiple joint sets, combinations of multiple fault sets, and combinations of joints-faults; the physical and mechanical parameters of the structural discontinuities in the model comprise positions of the structural discontinuities, dip directions of the structural discontinuities, dip angles of the structural discontinuities, spacings of the structural discontinuities and spatial position relationships between orientations of the structural discontinuities and tunnel axes, comprising perpendicular, parallel, oblique, and at an oblique intersection angle; and by establishing the numerically-simulating geometric model under the different combinations of the structural discontinuities, obtaining the principal stress vector diagram and a maximum principal stress diagram of a two-dimensional (2D) elastoplastic plane strain model to further gain the maximum principal stress values and a high-stress zone, evaluating a potential risk of tunnel rockburst based on both the maximum principal stress values and stress concentration situations, conducting verification by combining with combinations of the structural discontinuities exposed when a rockburst occurs during actual tunnel excavation, and calculating a frequency of rockburst occurring during actual tunnel excavation based on following parameters which exhibit high principal stress values and stress concentration and are obtained through numerical calculation:

spatial position combination of hazardous structural discontinuities, positions of hazardous structural discontinuities, dip directions of hazardous structural discontinuities, dip angles of hazardous structural discontinuities, spacings between hazardous structural discontinuities.

3. The method for judging geology of the time-delayed extremely intense rockburst according to claim 1, wherein the different combinations of the structural discontinuities in step 5.2 comprise: combinations of multiple joint sets, combinations of multiple fault sets, and combinations of joints-faults; and the corresponding physical and mechanical parameters of the structural discontinuities comprise: positions of the structural discontinuities, a spacing of the structural discontinuities, lengths of the structural discontinuities, dip directions of the structural discontinuities, and dip angles of the structural discontinuities.

* * * * *